No. 717,942. PATENTED JAN. 6, 1903.
F. STREICH & C. L. RUEHS.
MECHANICAL MOVEMENT.
APPLICATION FILED JAN. 10, 1902.
NO MODEL. 3 SHEETS—SHEET 1.
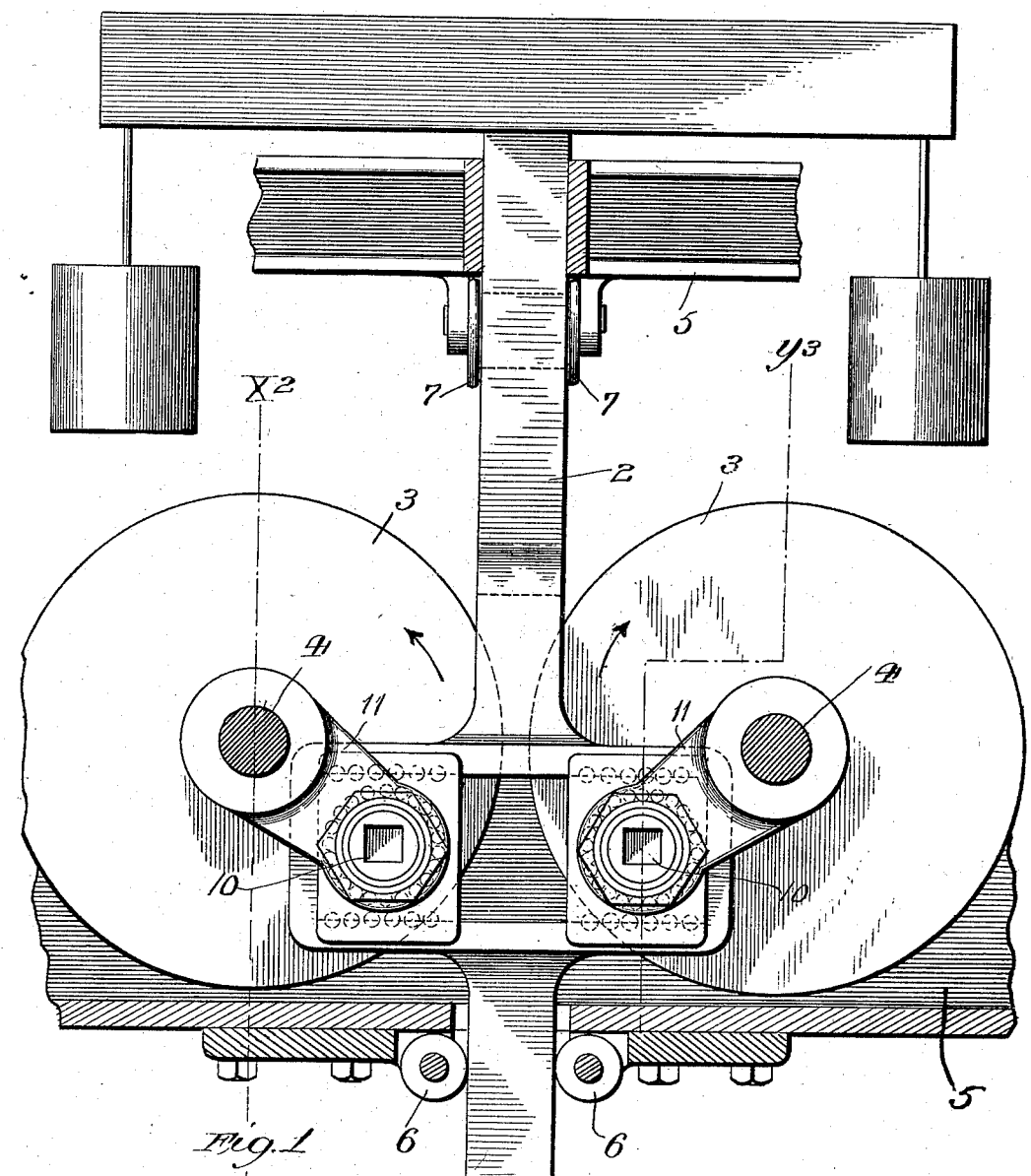
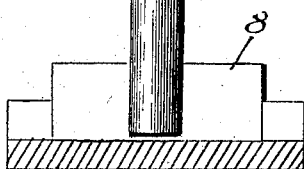

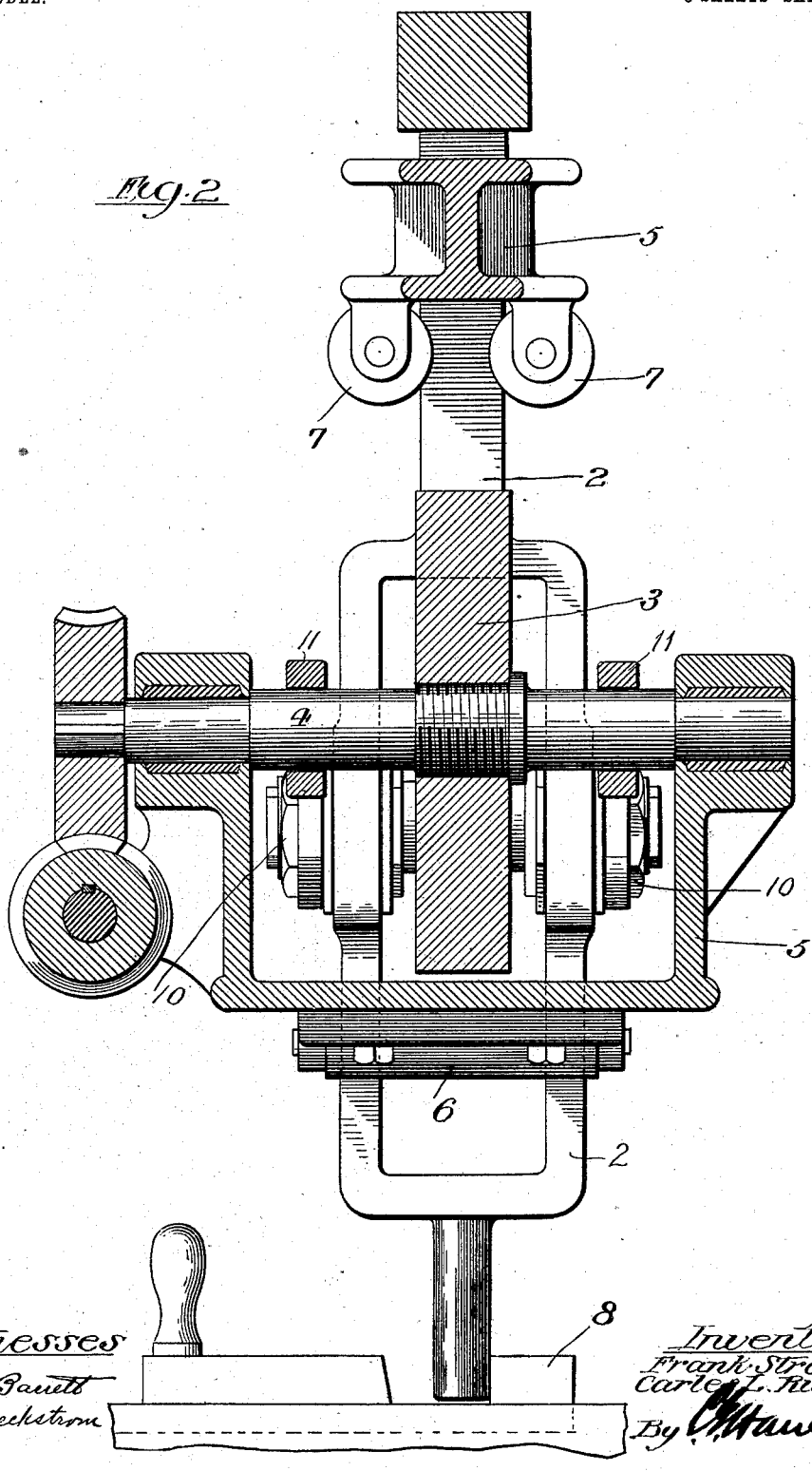

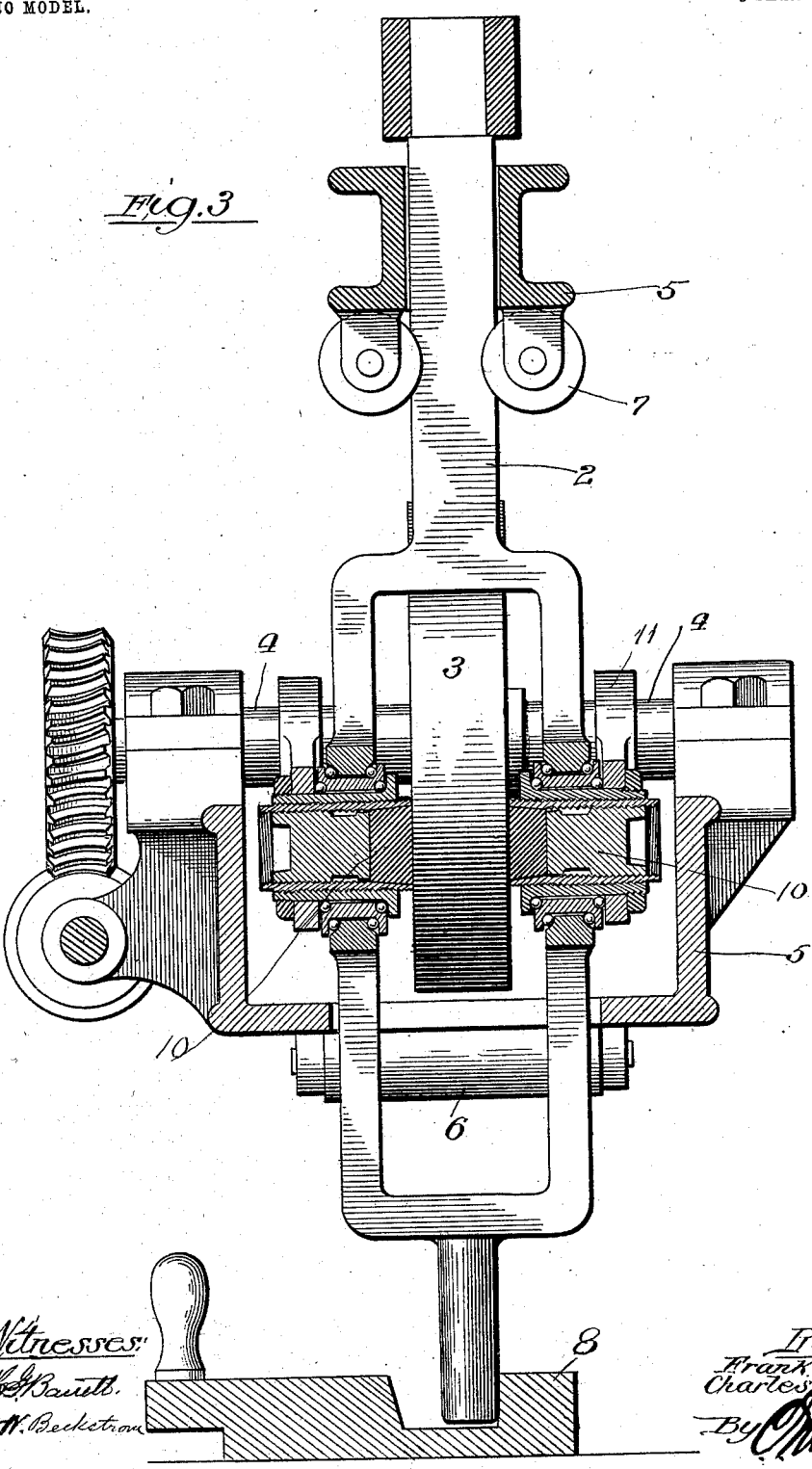

UNITED STATES PATENT OFFICE.

FRANK STREICH AND CHARLES L. RUEHS, OF CHICAGO, ILLINOIS, ASSIGNORS TO S. KARPEN & BROS., OF CHICAGO, ILLINOIS, A COPARTNERSHIP.

MECHANICAL MOVEMENT.

SPECIFICATION forming part of Letters Patent No. 717,942, dated January 6, 1903.

Application filed January 10, 1902. Serial No. 89,204. (No model.)

*To all whom it may concern:*

Be it known that we, FRANK STREICH and CHARLES L. RUEHS, citizens of the United States, residing at Chicago, Cook county, Illinois, have invented certain new and useful Improvements in Mechanical Movements, of which the following is a specification.

This invention relates to a novel mechanical movement, and has particular reference to mechanical movements of the class wherein certain elements are coupled together and movement is imparted to one thereof by or through the frictional engagement of one element with another and is the mechanical movement shown but not specifically claimed in our pending application entitled "Automatic carving-machines," filed November 20, 1901, Serial No. 82,971.

All frictional mechanical movements wherewith we are familiar are of such relation of elements that at least one thereof is adapted to or is capable of a preliminary or auxiliary movement either preparatory to or during the desired essential movement of the element and whereon such essential movement is dependent. Such mechanical movements cannot be used where it is necessary that the movement of the given element shall be begun from the moment of its attack by the hand or machine part designed to throw it into action, and there are various requirements and demands for a mechanical movement wherein the movable member shall be capable of simple reciprocation and shall be incapable of any other movement and, in addition, shall also be capable of movement with varying degrees of power and speed, infinite in variety, between the minimum and maximum limit. The need for such mechanical movement is met with in various automatic machines wherein it is desirable to throw out or withdraw the working tool or tools automatically under certain conditions and is also met with in pressing and in tension machines designed for the application of tension to various elements or objects.

Perhaps the most important need for a simple two-element movement is found in the automatic carving-machine, with particular reference to which this invention is designed.

The object of our invention is to provide a mechanical movement wherein one of the elements shall be capable of and shall be adapted for movement at varying speeds and with varying powers; and the particular object of our invention is to provide a mechanical movement having one element which while fixed against any other than reciprocatory or oscillatory movement shall yet be adapted to delicate hand or machine control while capable of exerting great power for the performance of any desired work.

Our invention consists, primarily, in a preferably reciprocatory element in combination with a second element operating in the direction of the desired movement of the said reciprocatory element and wherewith said element is engaged by lateral pressure and is thereby moved with a speed and power proportional to said lateral pressure; and our invention consists particularly in a mechanical movement comprising a reciprocatory element and a rotary element having parts in frictional contact and serving as guides one for the other, said rotary element being the actuating element and adapted to reciprocate the other element when lateral pressure is exerted thereon, and, further, our invention consists in various constructions and in combinations of parts, all as hereinafter described, and particularly pointed out in the claims.

The invention will be more readily understood by reference to the accompanying drawings, in which—

Figure 1 is a side view of a mechanical movement embodying our invention. Fig. 2 is a vertical transverre section thereof on the line $x^2$ $x^2$ viewed toward the reciprocating member. Fig. 3 is a vertical section on the line $y^3$ $y^3$ of Fig. 1 viewed toward the reciprocating member.

In general our mechanical movement comprises a reciprocatory bar 2 and a rotary member 3—a wheel or like device—which presents two outwardly-rotating friction-surfaces with both of which said reciprocatory member is in contact, whereby when the recipocatory member is pressed more or less firmly upon one or the other of said surfaces it will be caused to move therewith at the same or a less speed, according to the degree of pressure exerted.

Many different embodiments of our invention are deducible from the foregoing general statement, all possessing the generic essentials—to wit, a passive element whereto motion is to be imparted and an active element having a friction-surface always in contact therewith and through the medium of which motion may be imparted to the passive element upon the application of side or lateral pressure thereto, or, if desired, to the active element or friction-surface, it being obvious that the pressure may be exerted through either of them and that no lateral motion is required in either to produce the resultant movement of the passive or reciprocatory element.

The preferred form of our invention is shown in the drawings to comprise the longitudinally moving or reciprocating member 2 and two rotating disks 3 3. The disks are fixed upon shafts 4, which are held against longitudinal movement by their bearings in the frame 5. Any suitable means are employed to drive the disks continuously in opposite directions, as indicated by the arrows in Fig. 1. The longitudinally-movable member 2 is held firmly between the oppositely-placed antifriction slide-bearings 6 and 7, provided in the frame 5. The member 2 is provided with rigidly-fixed friction parts or buttons 10 on opposite sides of the disks 3, and these buttons are in close contact with the sides of the disks, and it is obvious that the member 2 cannot move in any but a longitudinal direction, said disks, with the associated bearings 6 and 7, effectually preventing lateral movement of the member 2. When pressure is applied to the bar in a lateral direction—that is, toward one side or the other of the friction-disks—the buttons upon that side will be held in more firm contact with the surfaces of the disks 3 3, with an increase in friction between the parts, which obviously will be proportional to the lateral pressure that is exerted upon member 2. At such times because of the friction the disks will tend to move or raise the member 2, and this tendency will be increased by any increase of pressure. Thus when the frictional engagement is strengthened by pressure the engagement between the element 2 and the rotating members or elements 3 becomes so strong that the member 2 will be actually moved or raised against the load that is placed thereon. Further, this movement of the member 2 will be at a speed that is exactly proportional to the pressure that is applied to the free end of the member 2, or, in other words, proportional to the friction that is thus created between the members or elements by pressure as contrasted with mere contact. Likewise the power of the member 2 is proportional to the lateral pressure upon the disks. The pressure that is required to thus cause the communication of movement to the member 2 by the disks is very slight, and even when the parts are very large and heavy the lateral pressure which may be exerted with the hand upon the end of the member 2 is sufficient; but ordinarily the movement of the bar or member 2 is made dependent upon the pressure applied through a laterally-movable element 8, which takes various forms in different machines. In a carving-machine this element 8 is the pattern to be reproduced. In a boring-machine it may be the work-holding plate. One disk alone is all that is necessary to secure the desired movement of the member 2; but we prefer to employ two in order to balance their forces. Where delicacy and sensitiveness are required, we prefer to correct the error of a fixed friction-button 10, moving upon the chord of an arc, which condition would exist if the buttons were fixed against cross movement in the element 2. To this end the buttons 10 are held at fixed distances from the axes 4 by the short arms 11, journaled on the shafts, and are arranged for sliding movement in the element 2, and to avoid friction with the bar we introduce ball-bearings; otherwise the friction at these points might be greater than the saving over fixed buttons. These ball-bearings may be of any desired construction so long as they permit the free cross movement of the buttons in the bar as it rises and falls and prevent any other movement of the buttons in the bar 2. The wear between the ends of the buttons and the sides of the disks is slow; but the buttons are arranged for adjustment to take up the wear, and, furthermore, are composed of both metal and another material having a high coefficient of friction in order that the frictional capacity of the buttons shall be as high as possible to communicate the largest possible force from the least lateral pressure upon the member 2.

Having thus described our invention, we claim as new and desire to secure by Letters Patent—

1. The mechanical movement comprising a reciprocatory element and a second element presenting two moving friction-surfaces in constant engagement with the first element and with either of which said first element is engageable for movement, by lateral pressure, substantially as described.

2. The mechanical movement comprising a reciprocatory element suitably guided and held against other movement, in combination with a rotary friction element always in contact with said reciprocatory element, for moving the same when pressure is established between said elements, substantially as described.

3. The mechanical movement comprising the longitudinally-moving member held against movement except in a longitudinal direction, in combination with a friction member having two friction-surfaces with both of which said longitudinally-moving member is in frictional contact, whereby when lateral pressure is exerted upon said longitudinally-moving member the same is caused to move at the same or a less speed than the friction-surfaces, substantially as described.

4. The mechanical movement comprising the reciprocatory element provided with adjustable friction-buttons, in combination with a rotary disk with the sides of which said buttons engage and whereby said reciprocatory element is movable when lateral pressure is exerted upon it, substantially as described.

5. The mechanical movement comprising the oscillatory element provided with four friction-buttons in combination with the oppositely-rotating friction elements, each in contact with two of said buttons, substantially as described.

6. The mechanical movement comprising the suitably-guided reciprocatory element provided with laterally-movable contact-buttons, in combination with the rotary disk in contact with both of said buttons, as and for the purpose specified.

7. The mechanical movement comprising the reciprocatory element in combination with the rotary-disk element with opposite sides of which said reciprocatory element engages, the associated guides 6 and 7, said disk and said guides holding said reciprocatory element against lateral movement whereby when lateral pressure is exerted upon said reciprocatory element, during the rotation of said disk, the lateral movement of the reciprocatory element is prevented and the same is moved by said disk, substantially as described.

8. The mechanical movement comprising the reciprocatory element 2, the rotary element 3, parts upon said element 2 for engaging upon opposite sides of said element 3, guides for said element 2 and the pressure-exerting element 8, substantially as described.

In testimony whereof we have hereunto subscribed our names, in the presence of two witnesses, this 7th day of December, 1901.

FRANK STREICH.
CHARLES L. RUEHS.

In presence of—
C. G. HAWLEY,
J. W. BECKSTROM.